United States Patent
Ono

(10) Patent No.: US 11,025,190 B2
(45) Date of Patent: Jun. 1, 2021

(54) MOTOR CONTROL DEVICE, MOTOR CONTROL SYSTEM, RUNAWAY STATE DETECTION METHOD, AND NON-TRANSITORY COMPUTER READABLE STORAGE MEDIUM

(71) Applicant: OMRON Corporation, Kyoto (JP)

(72) Inventor: Yasushi Ono, Kusatsu (JP)

(73) Assignee: OMRON Corporation, Kyoto (JP)

( * ) Notice: Subject to any disclaimer, the term of this patent is extended or adjusted under 35 U.S.C. 154(b) by 50 days.

(21) Appl. No.: 16/485,781

(22) PCT Filed: Jan. 29, 2018

(86) PCT No.: PCT/JP2018/002704
§ 371 (c)(1),
(2) Date: Aug. 13, 2019

(87) PCT Pub. No.: WO2018/163655
PCT Pub. Date: Sep. 13, 2018

(65) Prior Publication Data
US 2020/0052640 A1 Feb. 13, 2020

(30) Foreign Application Priority Data
Mar. 6, 2017 (JP) .............................. JP2017-042178

(51) Int. Cl.
*H02K 17/32* (2006.01)
*H02K 23/68* (2006.01)
(Continued)

(52) U.S. Cl.
CPC .............. *H02P 29/028* (2013.01); *H02P 6/10* (2013.01); *H02P 21/18* (2016.02); *H02P 21/20* (2016.02)

(58) Field of Classification Search
CPC ........ H02P 29/028; H02P 21/18; H02P 21/20; H02P 6/10
(Continued)

(56) References Cited

U.S. PATENT DOCUMENTS 5,689,170 A * 11/1997 Ishikawa ............... B60L 3/0023
                                                         318/799
6,335,604 B1 * 1/2002 Kataoka ................. B62D 5/046
                                                         180/6.44
(Continued)

FOREIGN PATENT DOCUMENTS

JP  H01120607   5/1989
JP  3058360     7/2000
(Continued)

OTHER PUBLICATIONS

"International Search Report (Form PCT/ISA/210) of PCT/JP2018/002704," dated Apr. 17, 2018, with English translation thereof, pp. 1-5.
(Continued)

*Primary Examiner* — Erick D Glass
(74) *Attorney, Agent, or Firm* — JCIPRNET

(57) ABSTRACT

Provided is a motor control device generating a torque command such that a detection speed of a motor matches a command speed, and controlling the motor. The motor control device includes: a torque command differential component taking a differential of the torque command and obtaining a torque command differential value; a motor actual speed second order differential component taking a second order differential of the detection speed of the motor and obtaining a motor jerk; and a runaway detection component determining that the motor is in a runaway state in a case where an abnormal state in which a sign of the motor jerk and a sign of the torque command differential value do not match continues for a predetermined time or more. Accordingly, the runaway of the motor can be detected in a short time while the erroneous detection can be suppressed.

14 Claims, 8 Drawing Sheets

(51) Int. Cl.
     *H02K 27/30*         (2006.01)
     *H02P 29/028*     (2016.01)
     *H02P 21/18*       (2016.01)
     *H02P 21/20*       (2016.01)
     *H02P 6/10*         (2006.01)

(58) Field of Classification Search
     USPC ........................................................ 318/434
     See application file for complete search history.

(56)                References Cited

U.S. PATENT DOCUMENTS

2007/0176573 A1*   8/2007   Iwashita ................ H02P 29/10
                                                                       318/723
2013/0144479 A1*   6/2013   Ito ........................ B60L 3/0061
                                                                         701/22
2014/0340796 A1    11/2014   Sandhu et al.

FOREIGN PATENT DOCUMENTS

| JP | 2007209080 | 8/2007 |
| JP | 2009297827 | 12/2009 |
| JP | 2010172117 | 8/2010 |
| JP | 2010250509 | 11/2010 |

OTHER PUBLICATIONS

"Written Opinion (Form PCT/ISA/237) of PCT/JP2018/002704", dated Apr. 17, 2018, with English translation thereof, pp. 1-6.
"Search Report of Europe Counterpart Application", dated Feb. 5, 2021, p. 1-p. 8.

\* cited by examiner

MOTOR CONTROL DEVICE, MOTOR CONTROL SYSTEM, RUNAWAY STATE DETECTION METHOD, AND NON-TRANSITORY COMPUTER READABLE STORAGE MEDIUM

CROSS-REFERENCE TO RELATED APPLICATION

This application is a 371 application of the international PCT application serial no. PCT/JP2018/002704, filed on Jan. 29, 2018, which claims the priority benefit of Japan application no. 2017-042178, filed on Mar. 6, 2017. The entirety of each of the above-mentioned patent applications is hereby incorporated by reference herein and made a part of this specification.

BACKGROUND

Technical Field

The invention relates to a motor control device detecting runaway of a motor.

Description of Related Art

Because of reasons such as miswiring of a servomotor, the servomotor may fall into a runaway state in which the servomotor accelerates in a direction opposite to the command.

A method of detecting such runaway is determining that the runaway state is present in the case where a torque command to the servomotor and the acceleration direction of the servomotor are different when the servomotor is accelerating. However, there is an issue that erroneous detection occurs in the case where the motor is moved by an offset or biased load.

To address this issue, Patent Document 1 monitors the speed when the servomotor starts to accelerate, compares the speed with a displacement speed which is a peak speed, and updates the displacement speed and performs runaway detection of the servomotor if the speed is higher than the displacement speed. However, this method has issues such as unable to detect the runaway until the motor speed exceeds the peak speed, and time-consuming to detect the runaway particularly in the case where there is a large inertial load. In addition, there is a possibility that erroneous detection may occur even in the case where the oscillation of control instability occurs due to the gain setting of a controller.

RELATED ART DOCUMENT(S)

Patent Document(S)

Patent Document 1: Japanese Patent No. 3058360

SUMMARY

Problem to be Solved

The objective of the invention is to detect runaway of a motor in a short time while suppressing erroneous detection.

Means for Solving the Problems

To solve the above issue, the invention compares the sign of a jerk (also referred to as an acceleration change rate or a jerk degree) and the sign of a torque command differential value and determines that a runaway state is present in the case where a mismatch between the sign of the jerk and the sign of the torque command differential value continues for a predetermined time or more.

Specifically, a motor control device according to an aspect of the invention is a motor control device generating a torque command, such that a detection speed of a motor matches a command speed, and controlling the motor, and includes: a torque command differential component taking a differential of the torque command and obtaining a torque command differential value; a motor actual speed second order differential component taking a second order differential of the detection speed of the motor and obtaining a motor jerk; and a runaway detection component determining that the motor is in a runaway state in a case where an abnormal state in which a sign of the motor jerk and a sign of the torque command differential value do not match continues for a predetermined time or more.

In the case of a biased load, etc., even though it is possible that the signs of the torque command and the motor acceleration do not match even in a normal operation, the signs of the torque command differential value and the motor jerk match if the operation is normal. Therefore, the motor control device of the aspect can quickly detect the runaway of the motor without erroneous detection even in the case where a biased load is present.

The runaway detection component of the aspect compares the signs of the torque command differential value and the motor jerk at a predetermined interval and can determine that the motor is in the runaway state in the case where a determination result of mismatch is repeatedly detected for a predetermined number of times. For example, in a case where the predetermined time is 10 milliseconds, it preferable that the determination on match/mismatch of signs is made every millisecond, and the runaway state is determined as present when the mismatch occurs ten consecutive times.

It is preferable that, in the aspect, the runaway detection component also determines that the abnormal state is present in a case where a sign of a motor acceleration, which is a first order differential value of the motor, and a sign of the torque command do not match when the torque command is other than 0 and a differential value of the torque command is 0.

It is assumed that the torque command value is saturated in the runaway. In this case, the torque command differential value becomes 0, and the runaway cannot be detected by comparing the signs of the torque command differential value and the motor jerk. Therefore, in the case where the torque command is other than 0 and the torque command differential value is 0, it is preferable to detect the runaway according to the sign of the motor acceleration and the sign of the torque command. Since the state in which the motor acceleration and the torque command do not match despite that the torque is saturated is not a normal operation, an erroneous detection does not occur even in the determination based on the sign of the motor acceleration and the sign of the torque command when the torque is saturated.

The runaway state detection component may also consider the abnormal state based on the mismatch between the sign of the torque command differential value and the sign of the motor jerk and the abnormal state based on the mismatch between the torque command and the motor acceleration when the torque command is saturated as the same abnormal state, and determine that the motor runs away in the case where one of the abnormal states is satisfied for the predetermined time or more. Alternatively, the runaway state detection component may consider the two runaway states as different and determine that the motor runs away in the case where one of the conditions continues for the predetermined time or more.

It may also be that the runaway detection component of the aspect resets a duration of the abnormal state to zero in a case where the sign of the motor jerk and the sign of the torque command differential value match before the abnormal state has continued for the predetermined time or more. It may also be that the runaway detection component of the aspect resets a duration of the abnormal state to zero in a case where the sign of the motor acceleration and the sign of the torque command match when the torque command is other than 0 and the differential value of the torque command is 0 before the abnormal state has continued for the predetermined time or more.

According to such configurations, the erroneous detections due to mismatch of signs resulting from accidentally occurring sign mismatches or noise, etc., can be eliminated.

In the aspect, it is preferable that the torque command differential component and the motor actual speed second order differential component apply a low-pass filter for an input signal and obtain a differential value. In the case where the band of the differential component is not limited, the gain becomes higher as the frequency becomes higher, the noise increases, and the erroneous detection occurs more easily. By limiting the band of the differential signal by providing the low pass filter in the differential component, the erroneous detection caused by the noise generated through taking a differential can be suppressed.

It is preferable that the motor control device in the aspect further includes an emergency stop component stopping the motor by at least one of cutting off current supply to the motor, using a dynamic brake, and setting the torque command to 0 when the runaway detection component detects the runaway state of the motor.

According to such configuration, the motor can be stopped immediately when the runaway of the motor is detected.

According to another aspect of the invention, a motor control device is a motor control device generating a torque command, such that a detection speed of a motor matches a command speed, and controlling the motor, and includes: a runaway state detection component determining that an abnormal state is present in a case where a sign of a motor jerk, which is a second order differential value of the detection speed of the motor, and a sign of a differential value of the torque command do not match, and determining that the motor is in a runaway state in a case where the abnormal state continues for a predetermined time or more.

According to still another aspect of the invention, a motor control system includes a motor and the motor control system above.

The invention can be construed as a motor control device having at least a portion of the functions. In addition, the invention can be construed as a control method executing at least a portion of the processes. Moreover, the invention can be construed as a computer program for executing the method in a computer or a computer readable storage medium non-transitory storing the computer program. Each component and process can be combined with each other within a possible extent to configure the invention.

Effects of Invention

The motor control device can detect the runaway of the motor in a short time while suppressing the erroneous detection.

DESCRIPTION OF THE EMBODIMENTS

First Embodiment

[Configuration]

Figure 1:
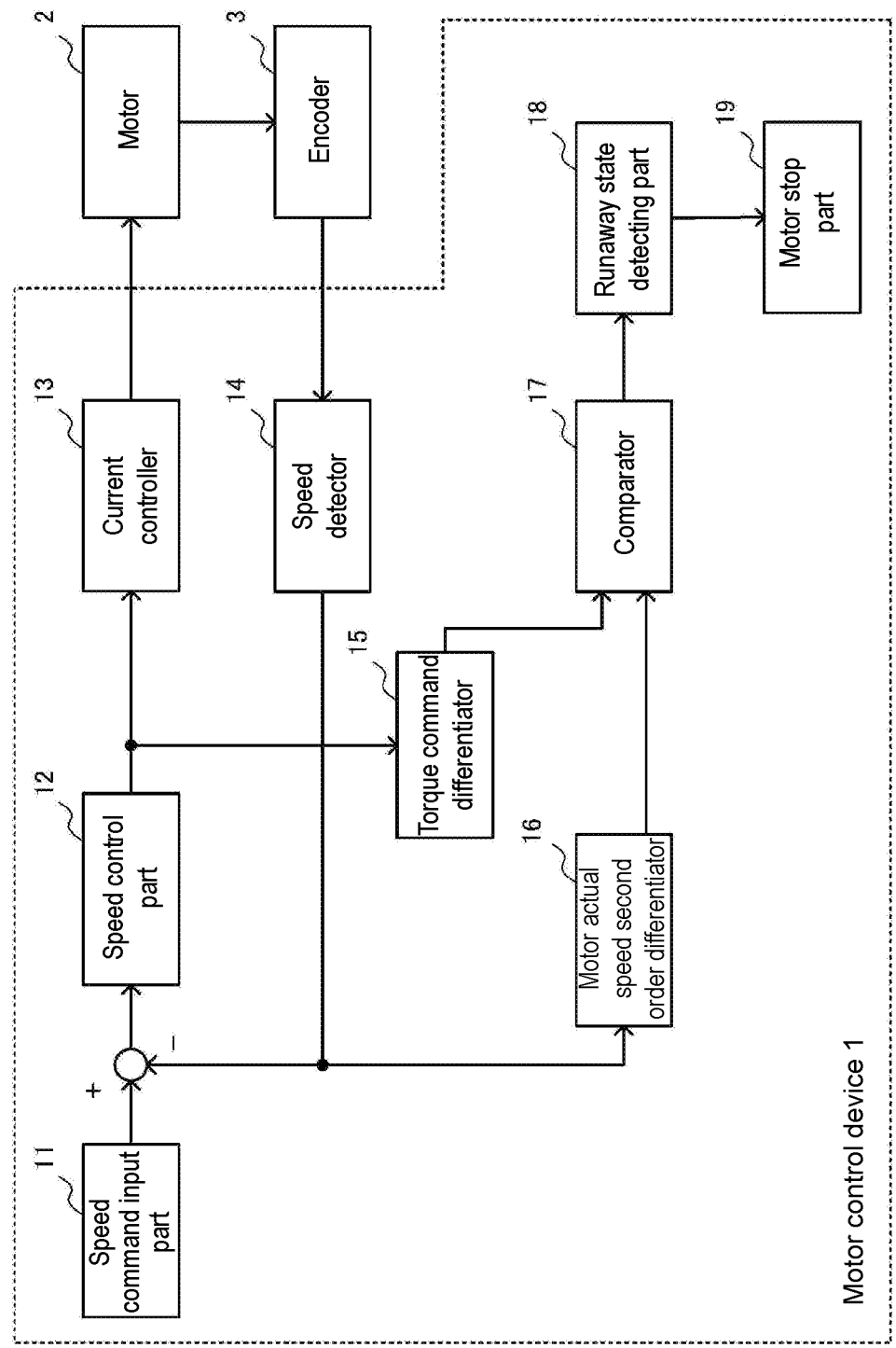
FIG. 1 is a block diagram of a motor control device in a first embodiment.

FIG. 1 shows a schematic configuration of a motor control system in which a motor control device of the invention is installed. The motor system includes a motor control device 1, a motor 2 and an encoder 3. The motor control device 1 has a function of generating a torque command, such that the speed of the motor 2 matches a speed command from a controller (not shown), to control the motor 2 and detecting runaway of the motor 2. The motor 2 is installed in the device as an actuator of various machinery devices (e.g., arms and transfer devices of industrial robots) that are not shown herein. For example, the motor 2 is an AC motor. The encoder 3 is attached to the motor 2 to detect an operation of the motor 2. The encoder 3 includes location information concerning a rotational location (angle) of a rotational axis of the motor 2, information of a rotational speed of the rotational axis, etc. A general incremental encoder or an absolute encoder can be used as the encoder 3.

A more specific configuration of the motor control device 1 is described. The motor control device 1 includes a speed command input part 11, a speed control part 12, a current controller 13, a speed detector 14, a torque command differentiator 15, a motor actual speed second order differentiator 16, a comparator 17, a runaway state detecting part 18, and a motor stop part 19. Among these configurations, the torque command differentiator 15, the motor actual speed second order differentiator 16, the comparator 17, and the runaway state detecting part 18 are functional parts for detecting the runaway of the motor 2.

The speed command input part 11 receives a command speed of the motor 2 from a controller (not shown). The speed detector 14 obtains the actual speed (detection speed) of the motor 2 based on a feedback signal from the encoder 3. The speed control part 12 generates a torque command such that the command speed matches the detection speed. The current controller 13 turns on/off a switching element such as an IGBT based on the torque command to supply AC power to the motor 2.

The torque command differentiator 15 receives the torque command generated by the speed control part 12 and calculates its differential value (first-order differential value). Hereinafter, the output of the torque command differentiator 15 is referred to as a torque command differential value.

The motor actual speed second order differentiator 16 receives a motor actual speed output by the speed detector 14 and calculates its second order differential value. The second order differential of the speed (the first order differential of the acceleration) is referred to as jerk, jerk degree, acceleration change rate, etc. Hereinafter, the output of the motor actual speed second order differentiator 16 is referred to as a motor jerk.

The comparator 17 receives the torque command differential value from the torque command differentiator 15 and the motor jerk from the motor actual speed second order differentiator 16, and determines whether the signs of these values match. The comparison result by the comparator 17 is input to the runaway state detecting part 18.

The runaway state detecting part 18 uses the comparison result by the comparator 17 to determine whether the motor 2 is in the runaway state. Specifically, the runaway state detecting part 18 determines that an abnormal state is present in the case where the sign of the torque command differential value and the sign of the motor jerk do not match, and determines that the motor 2 is in the runaway state in the case where the abnormal state continues for a predetermined time or more. In addition, while FIG. 1 shows that only the comparison result of the comparator 17 is input to the runaway state detecting part 18, a torque command value or a motor actual speed (detection speed) is actually input. These pieces of information are also used to detect the runaway state of the motor 2. Details of the runaway state detection process are described below with reference to the flowchart.

The torque command differentiator 15, the motor actual speed second order differentiator 16, the comparator 17 and the runaway state detecting part 18 may be implemented as digital circuits or analog circuits. Also, these functional parts may be realized by a combination of a digital signal processor (DSP), a field programmable gate array (FGPA), a microprocessor unit (MPU) and a program.

When receiving a signal indicating that the runaway state has been detected from the runaway state detecting part 18, the motor stop part 19 puts an emergency stop on the motor 2. For example, the motor stop part 19 stops the motor 2 by one of cutting off the current supply from the current controller 13 to the motor 2, using a dynamic brake (regenerative brake), or setting the torque command to zero, or a combination of a plurality of the aforementioned.

[Process]

Figure 2:
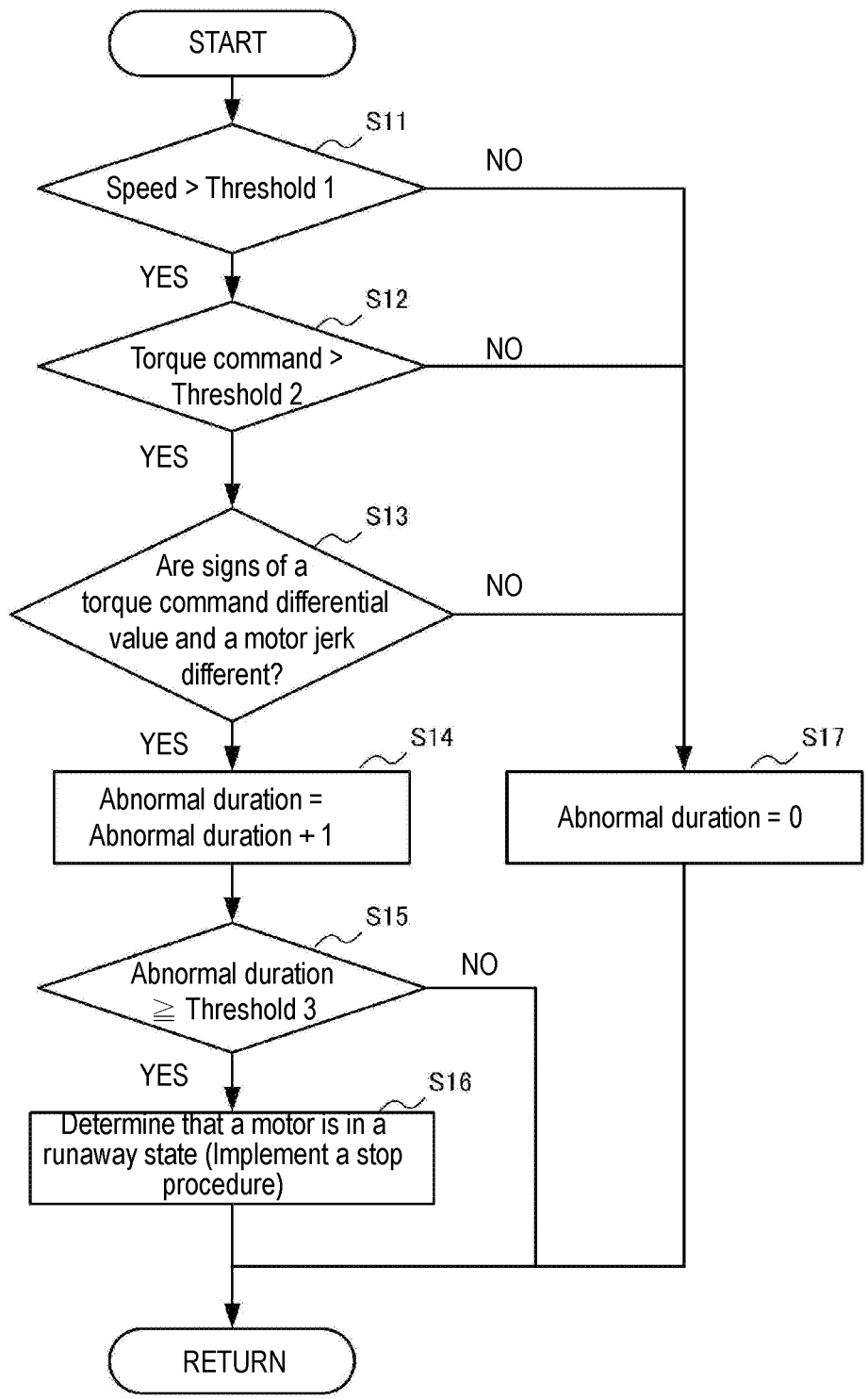
FIG. 2 is a flowchart of a runaway state detection process in the first embodiment.
Figure 3A:
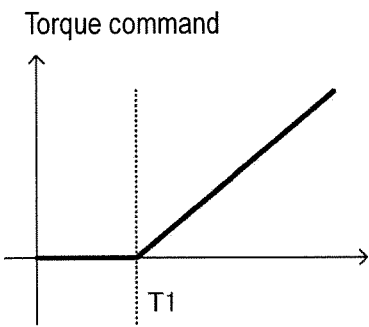
FIG. 3A to FIG. 3E are diagrams describing runaway state detection in a case of miswiring in the first embodiment.
Figure 3D:
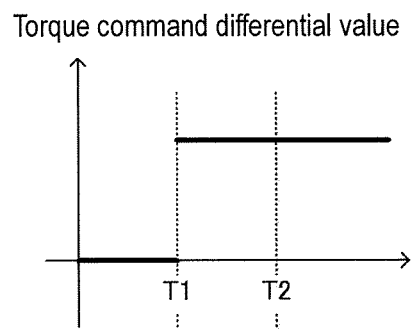
Figure 3B:
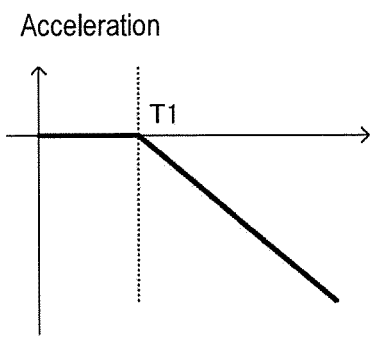
Figure 3E:
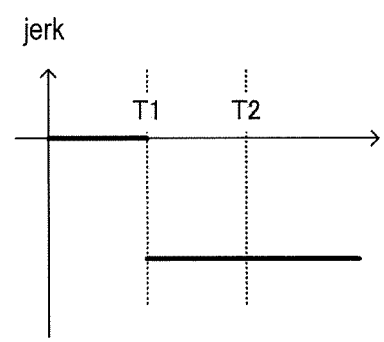
Figure 3C:
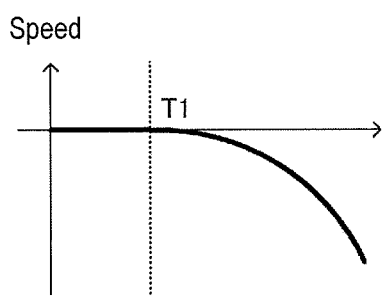
Figure 4A:
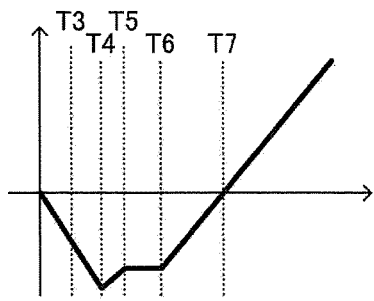
FIG. 4A to FIG. 4E are diagrams describing runaway state detection in a case where a disturbance occurs in the first embodiment.
Figure 4D:
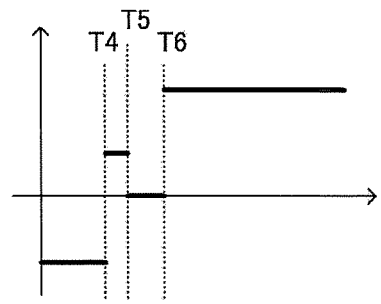
Figure 4B:
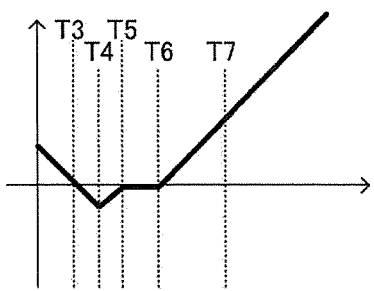
Figure 4E:
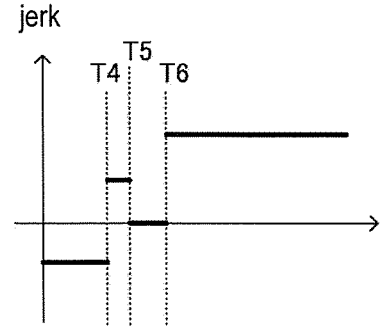
Figure 4C:
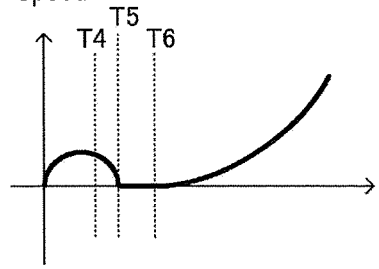

FIG. 2 is a flowchart showing a flow of the runaway state detection process by the runaway state detecting part 18. The process shown in FIG. 2 is executed periodically, and the execution interval thereof may be arbitrary, but, for example, can be set at about one millisecond.

First, as a premise of the runaway state detection, the runaway state detecting part 18 confirms in Step S11 that the motor detection speed is equal to or higher than a first threshold (threshold 1) and in Step S12 that the torque command is equal to or higher than a second threshold (threshold 2). The determination in Step S11 is to confirm that the motor is in operation, and a sufficiently small value is set as the first threshold. The determination in Step S12 is a determination to avoid erroneous detection, and, for example, a value of about 10% of a rated torque is set as the second threshold.

In the case where one of the determinations in Steps S11 and S12 is not satisfied (S11—NO or S12—NO), the process proceeds to Step S17, and the runaway state detecting part 18 sets an abnormal duration for counting the continuation of the abnormal state to zero.

In the case where both of the determinations in Steps S11 and S12 are satisfied (S11—YES and S12—YES), the process proceeds to Step S13, and the runaway state detecting part 18 determines whether the sign of the torque command differential value and the sign of the motor jerk are different. This determination is made based on the output from the comparator 17.

In the case where the sign of the torque command differential value and the sign of the motor jerk are different (S13—YES), the process proceeds to Step S14, and the runaway state detecting part 18 increases the abnormal duration. On the other hand, in the case where the sign of the torque command differential value and the sign of the motor jerk match (S13—NO), the process proceeds to Step S17, and the runaway state detecting part 18 resets the abnormal duration to zero.

In Step S15, the runaway state detecting part 18 determines whether the abnormal duration is equal to or greater than a third threshold (predetermined time). The third threshold (threshold 3) is a time with which the motor can be determined as running away in the case where the mismatch between the sign of the torque command differential value and the sign of the motor jerk continues for the predetermined time or more. For example, 10 milliseconds (10 in the value of a counter) can be adopted as the third threshold.

In the case where the abnormal duration is less than the third threshold (S14—NO), the runaway state detecting part 18 ends the process while holding the determination. On the other hand, in the case where the abnormal duration is greater than or equal to the third threshold (S14—YES), the process proceeds to Step S16, and the runaway state detecting part 18 determines that the motor 2 is in the runaway state. In the case where the runaway of the motor 2 is detected, the motor stop part 19 implements an emergency stop procedure of the motor 2.

Operation example

Detailed cases in the runaway state detection process are described with reference to FIG. 3A to FIG. 3E and FIG. 4A to FIG. 4E.

FIG. 3A to FIG. 3E are diagrams respectively showing torque command value, motor acceleration, motor speed, torque command differential value, and motor jerk in the case where the connection between the motor control device 1 and the motor 2 is erroneous. In this case, the direction of the torque command and the rotational direction of the motor are opposite, and a speed control loop constitutes a positive feedback. Therefore, the torque command increases with time, and the speed of the motor 2 also increases in the opposite direction.

In this embodiment, the runaway of the motor 2 can be detected quickly regardless of the size of the load inertia of the motor. The reason is that this embodiment does not require, as the condition for runaway detection, that the motor speed exceeds the peak speed, but sets a mismatch between the sign of the torque command differential value and the sign of the motor jerk as the condition. The sign of the torque command differential value and the sign of the motor jerk become different immediately after the motor is driven (T1), and therefore the runaway of the motor can be detected at T2 after the predetermined time has elapsed from T1.

FIG. 4A to FIG. 4E are diagrams respectively showing torque command value, motor acceleration, motor speed, torque command differential value, and motor jerk in the case where a disturbance such as a biased load is present. In this example, it is assumed that the motor held by a brake, etc., is released from a holding state after driving starts, and acceleration is generated by the biased load.

In the case where the biased load is present, there is a case where the sign of the torque command and the sign of the motor acceleration do not match. In the example of the figure, the sign of the torque command and the sign of the motor acceleration do not match in a period from driving to T3 and a period from T6 to T7. Therefore, in the case where runaway detection is performed based on the sign of the torque command and the sign of the motor acceleration, as in the prior art, there is a possibility that erroneous detection may occur.

However, the sign of the torque command differential value and the sign of the motor jerk match in all periods. Therefore, even in the case where a disturbance, such as a biased load, is present, this embodiment can avoid erroneously detecting that the motor runs away even though the motor does not run away.

As described above, according to the embodiment, the runaway can be detected quickly regardless of the load inertia of the motor, and the erroneous detection in the case where a disturbance occurs can be suppressed.

Second Embodiment

[Configuration]

Figure 5:
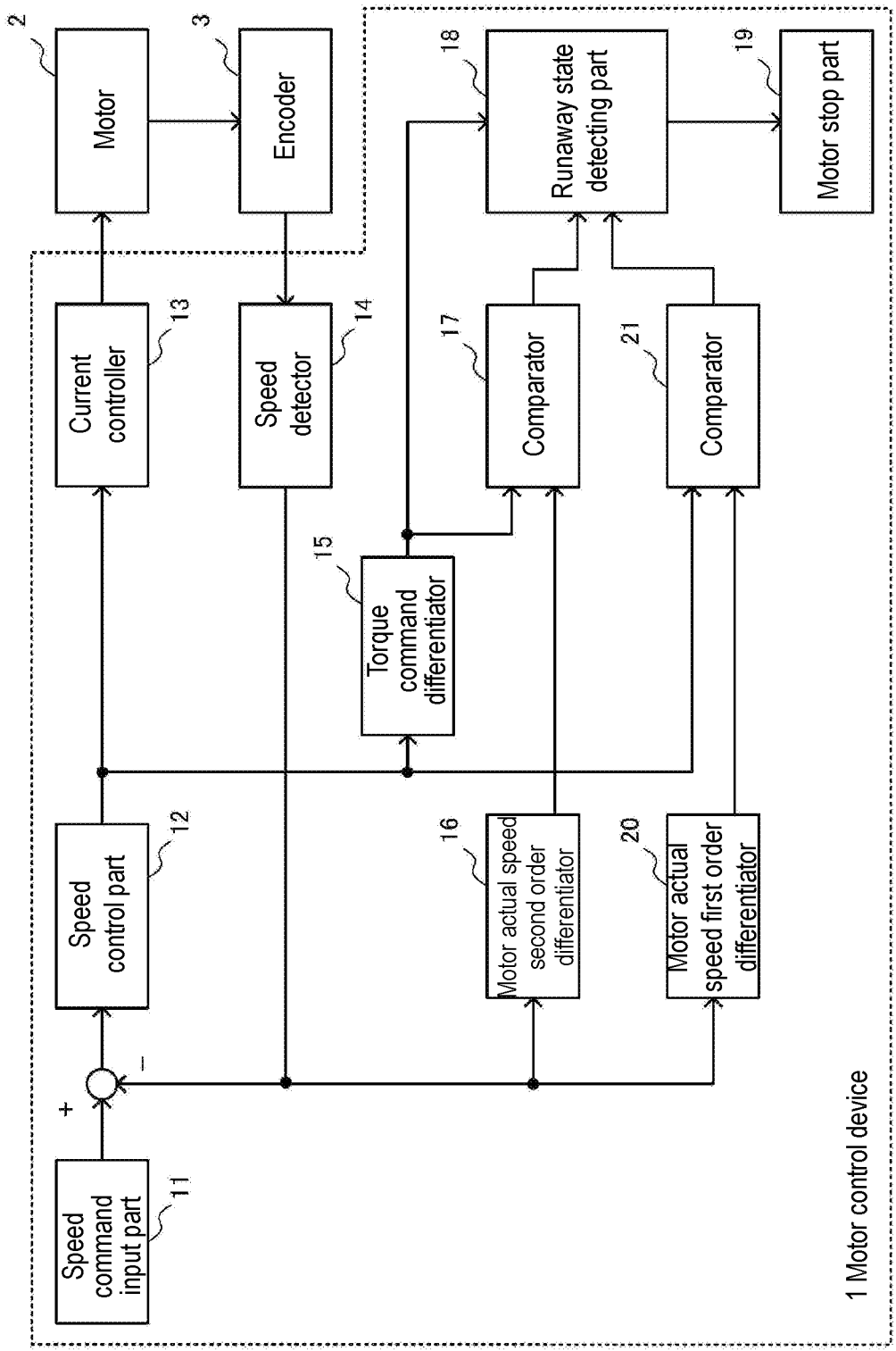
FIG. 5 is a block diagram of a motor control device in a second embodiment.

The second embodiment makes it possible to detect runaway of a motor even when the torque command is saturated. FIG. 5 is a diagram showing a configuration of the motor control device 1 according to this embodiment. Among the functional parts shown in FIG. 5, those substantially identical to the functional parts shown in FIG. 1 are referred to with the same reference symbols, and the detailed description thereof is omitted.

Compared with the first embodiment, the motor control device 1 according to this embodiment includes a motor actual speed first order differentiator 20 and a comparator 21.

The motor actual speed first order differentiator 20 receives a motor actual speed output by the speed detector 14 and calculates its first order differential value. Hereinafter, the output of the motor actual speed first order differentiator 20 is referred to as motor acceleration.

The comparator 21 receives the torque command value from the speed control part 12 and the motor acceleration from the motor actual speed first order differentiator 20, and determines whether the signs of these values match. The comparison result by the comparator 21 is input to the runaway state detecting part 18.

The runaway state detecting part 18 in this embodiment receives a comparison result of the comparator 21 and the torque command differential value from the torque command differentiator 15 in addition to the comparison result of the comparator 17. The runaway state detection process in the runaway state detecting part 18 of this embodiment will be described with reference to FIG. 6.

[Process]

Figure 6:
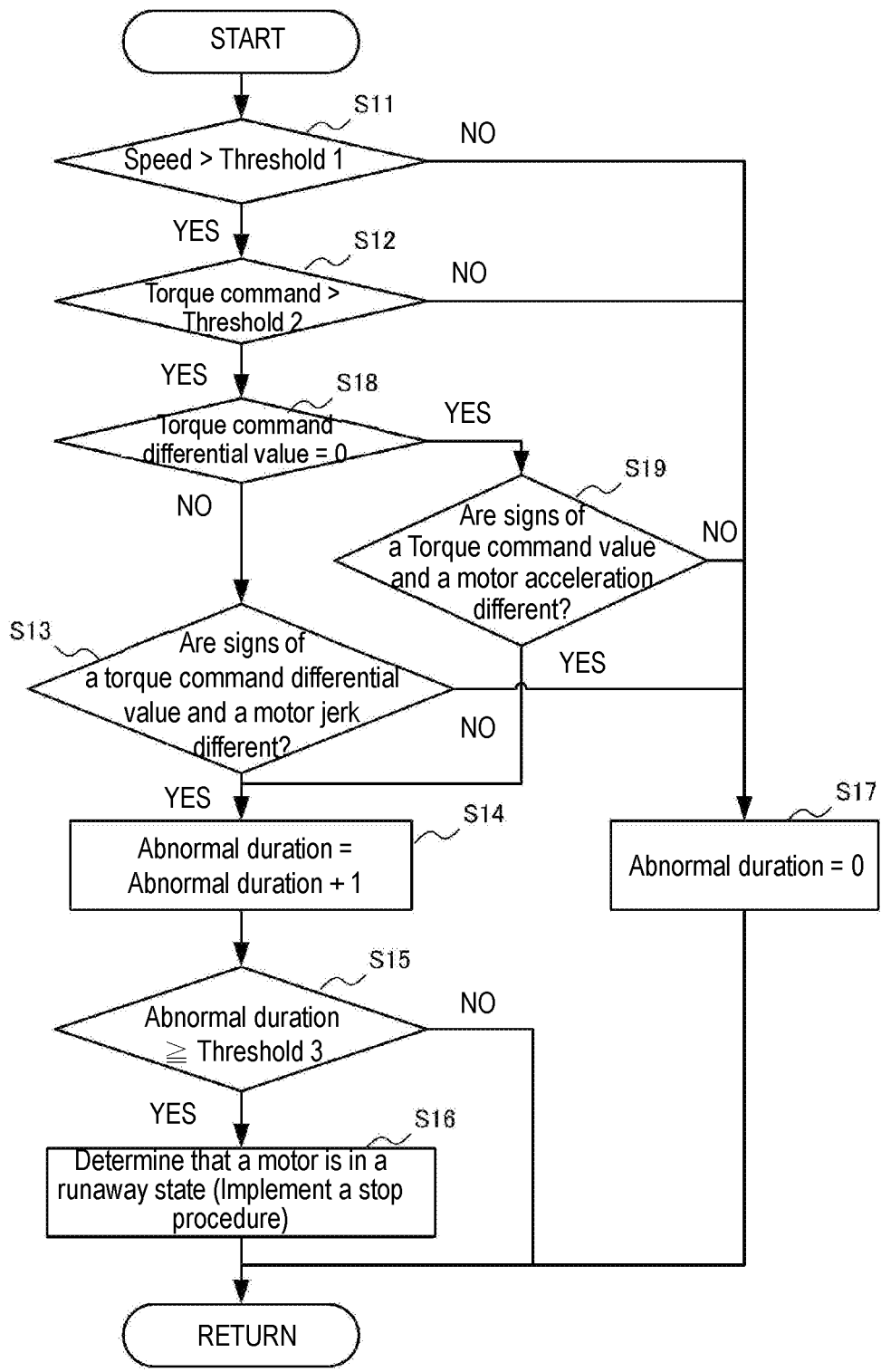
FIG. 6 is a flowchart of a runaway state detection process in the second embodiment.
Figure 7A:
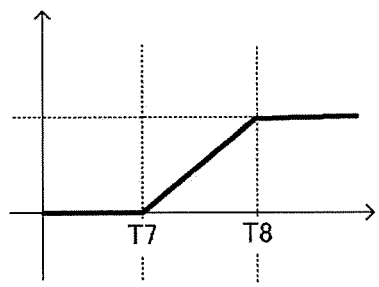
FIG. 7A to FIG. 7E are diagrams describing a runaway state detection process in the second embodiment.
Figure 7D:
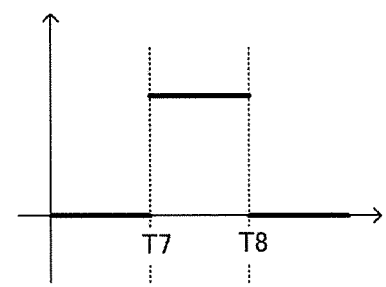
Figure 7B:
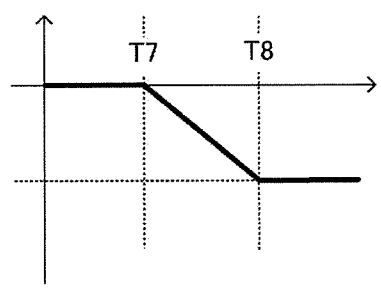
Figure 7E:
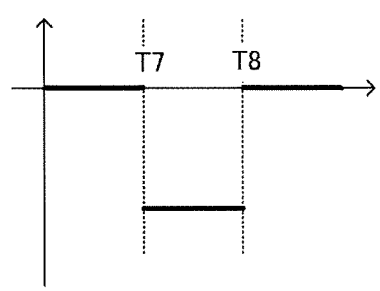
Figure 7C:
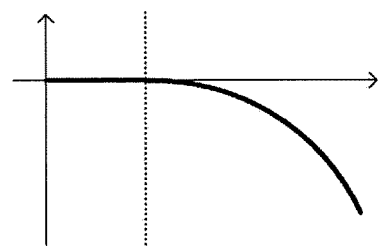

In the flowchart of FIG. 6, those substantially identical to the processes shown in FIG. 2 are referred to with the same reference symbols, and the detailed description thereof is omitted. In this embodiment, in the case where both of the determinations in Steps S11 and S12 are satisfied, the runaway state detecting part 18 determines in Step S18 whether the torque command differential value is zero. In the case where the torque command differential value is not zero (S18—NO), the process proceeds to Step S13 and the same determination as in the first embodiment is performed. That is, if the sign of the torque command differential value and the sign of the motor jerk are different, it is determined that the abnormal state is present and the abnormal duration is increased, otherwise the abnormal duration is reset to zero.

On the other hand, in the case where the torque command differential value is zero (S18—YES), the process proceeds to Step S19. In Step S19, the runaway state detecting part 18 uses the comparison result by the comparator 21 to determine whether the sign of the torque command value and the sign of the motor acceleration are different. Although the torque command is saturated, it cannot be said that the state in which the rotational direction of the motor is opposite to the command is a normal state. Therefore, in the case where these signs are different, it is determined that the abnormal state is present, and the process proceeds to Step S14 to increase the abnormal duration. On the other hand, in the case where these signs match, it is determined that the abnormal state is not present, and the process proceeds to Step S17 to reset the abnormal duration to zero. The subsequent processes are the same as those in the first embodiment.

Operation example

FIG. 7A to FIG. 7E are diagrams respectively showing torque command value, motor acceleration, motor speed, torque command differential value, and motor jerk in the case where the torque command is saturated when the motor control device 1 and the motor 2 are incorrectly connected. Due to miswiring, the sign of the torque command differential value differs from the sign of the motor jerk. Here, it is assumed that the time until the torque command is saturated (time from T7 to T8) is shorter than the threshold time for runaway detection. After T8, since the differential value of the torque command becomes zero and therefore the motor jerk becomes zero, the runaway detection based on the signs of these values cannot be performed. However, in this embodiment, when the torque command differential value is zero, the sign of the torque command and the sign of the motor acceleration can be compared to detect the runaway of the motor.

As described above, in this embodiment, even in the case where the torque command is saturated, the runaway of the motor can be reliably detected.

In this embodiment, the runaway state detecting part 18 determines that the runaway state is present in the case where a state in which one of the determination of Step S13 and the determination of Step S19 is affirmed continues for the predetermined time or more. However, the runaway state detecting part 18 may also consider the state in which Step S13 is affirmed and the state in which Step S19 is affirmed as different abnormal states respectively and make a determination that the runaway state is present in the case where one of the abnormal states continues for the predetermined time or more.

Modified Example 1

Even though the examples of performing speed control on the motor have been described in the above embodiments, the motor control device may also perform location control. In addition, even though it is assumed that the motor control device 1 is a servo driver, the motor control device 1 may also be an inverter. As a motor driven by an inverter, an induction motor can serve as an example.

Modified Example 2

Figure 8A:
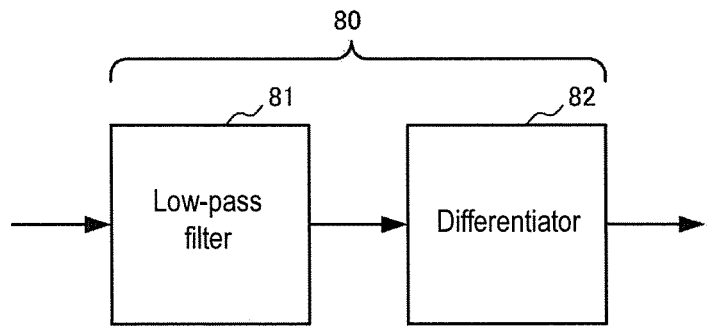
FIG. 8A is a diagram describing a differentiator in a third embodiment.
Figure 8B:
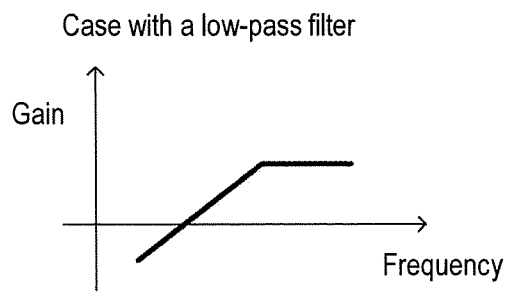
FIG. 8B is a diagram describing an effect according to a low-pass filter of the differentiator in the third embodiment.
Figure 8C:
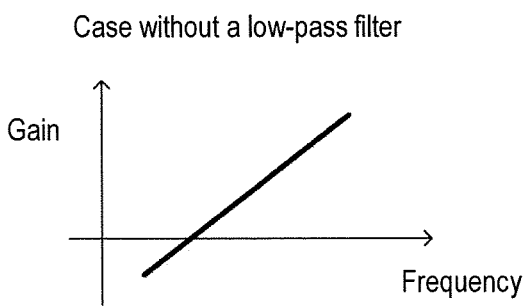
FIG. 8C is a diagram describing a differentiator without a low-pass filter.

As the differentiator (the first order differential differentiator, the second order differentiator) in the above embodiments, as shown in FIG. 8A, a band limiting differentiator 80 consisting of a low-pass filter 81 and a differentiator 82 may also be adopted. The band limiting differentiator 80 can limit the band of the differentiator 82 by applying the low-pass filter for an input signal and obtaining the differential value. In the case where the band of the differentiator is not limited by the low-pass filter, as shown in FIG. 8C, the gain becomes higher as the frequency becomes higher, and the noise increases. Therefore, the erroneous detection of the runaway state occurs more easily. Regarding this, by limiting the band of the differentiator by the low-pass filter, as shown in FIG. 8B, the gain under a high frequency can be suppressed, and the noise can be educed. Therefore, the occurrence of the erroneous detection of the runaway state due to the noise generated by taking a differential can be suppressed.

What is claimed is:

1. A motor control device, generating a torque command, such that a detection speed of a motor matches a command speed, and controlling the motor, the motor control device comprising:
    a torque command differential component taking a differential of the torque command and obtaining a torque command differential value;
    a motor actual speed second order differential component taking a second order differential of the detection speed of the motor and obtaining a motor jerk;
    a runaway detection component determining that the motor is in a runaway state in a case where an abnormal state in which a sign of the motor jerk and a sign of the torque command differential value do not match continues for a predetermined time or more,
    wherein the runaway detection component resets a duration of the abnormal state to zero in a case where the sign of the motor jerk and the sign of the torque command differential value match before the abnormal state has continued for the predetermined time or more.

2. The motor control device as claimed in claim 1, wherein the runaway detection component also determines that the abnormal state is present in a case where a sign of a motor acceleration, which is a first order differential value of the motor, and a sign of the torque command do not match when the torque command is other than 0 and the torque command differential value is 0.

3. The motor control device as claimed in claim 2, wherein the runaway detection component resets a duration of the abnormal state to zero in a case where the sign of the motor acceleration and the sign of the torque command match when the torque command is other than 0 and the torque command differential value is 0 before the abnormal state has continued for the predetermined time or more.

4. The motor control device as claimed in claim 3, wherein the torque command differential component and the motor actual speed second order differential component apply a low-pass filter for an input signal and obtain a differential value.

5. The motor control device as claimed in claim 3, further comprising:
    an emergency stop component stopping the motor by at least one of cutting off current supply to the motor, using a dynamic brake, and setting the torque command to 0 when the runaway detection component detects the runaway state of the motor.

6. The motor control device as claimed in claim 2, wherein the torque command differential component and the motor actual speed second order differential component apply a low-pass filter for an input signal and obtain a differential value.

7. The motor control device as claimed in claim 2, further comprising:
    an emergency stop component stopping the motor by at least one of cutting off current supply to the motor, using a dynamic brake, and setting the torque command to 0 when the runaway detection component detects the runaway state of the motor.

8. The motor control device as claimed in claim 1, wherein the torque command differential component and the motor actual speed second order differential component apply a low-pass filter for an input signal and obtain a differential value.

9. The motor control device as claimed in claim 8, further comprising:
    an emergency stop component stopping the motor by at least one of cutting off current supply to the motor, using a dynamic brake, and setting the torque command to 0 when the runaway detection component detects the runaway state of the motor.

10. The motor control device as claimed in claim 1, further comprising:
    an emergency stop component stopping the motor by at least one of cutting off current supply to the motor, using a dynamic brake, and setting the torque command to 0 when the runaway detection component detects the runaway state of the motor.

11. A control system, comprising:
    a motor; and
    the motor control device as claimed in claim 1.

12. A motor control device, generating a torque command, such that a detection speed of a motor matches a command speed, and controlling the motor, the motor control device comprising:
    a runaway state detection component determining that an abnormal state is present in a case where a sign of a motor jerk, which is a second order differential value of the detection speed of the motor, and a sign of a differential value of the torque command do not match, and determining that the motor is in a runaway state in a case where the abnormal state continues for a predetermined time or more,
    wherein the runaway state detection component resets a duration of the abnormal state to zero in a case where the sign of the motor jerk and the sign of the differential value of the torque command match before the abnormal state has continued for the predetermined time or more.

13. A runaway state detection method, which is a runaway state detection method of a motor performed by a motor control device generating a torque command, such that a detection speed of the motor matches a command speed, and controlling the motor, the runaway state detection method comprising following steps:
- taking a differential of the torque command and obtaining a torque command differential value;
- taking a second order differential of the detection speed of the motor and obtaining a motor jerk;
- determining that the motor is in a runaway state in a case where an abnormal state in which a sign of the motor jerk and a sign of the torque command differential value do not match continues for a predetermined time or more; and
- resetting a duration of the abnormal state to zero in a case where the sign of the motor jerk and the sign of the torque command differential value match before the abnormal state has continued for the predetermined time or more.

14. A non-transitory computer readable storage medium storing a program for executing each step of the method as claimed in claim 13 in a computer.

* * * * *